Nov. 18, 1947. I. F. SPRUNGER 2,430,961
MECHANICAL DEVICE FOR LOCKING TOGETHER THE
MATCHING SURFACES OF PREFABRICATED PANELS
Filed Dec. 14, 1945 2 Sheets-Sheet 1
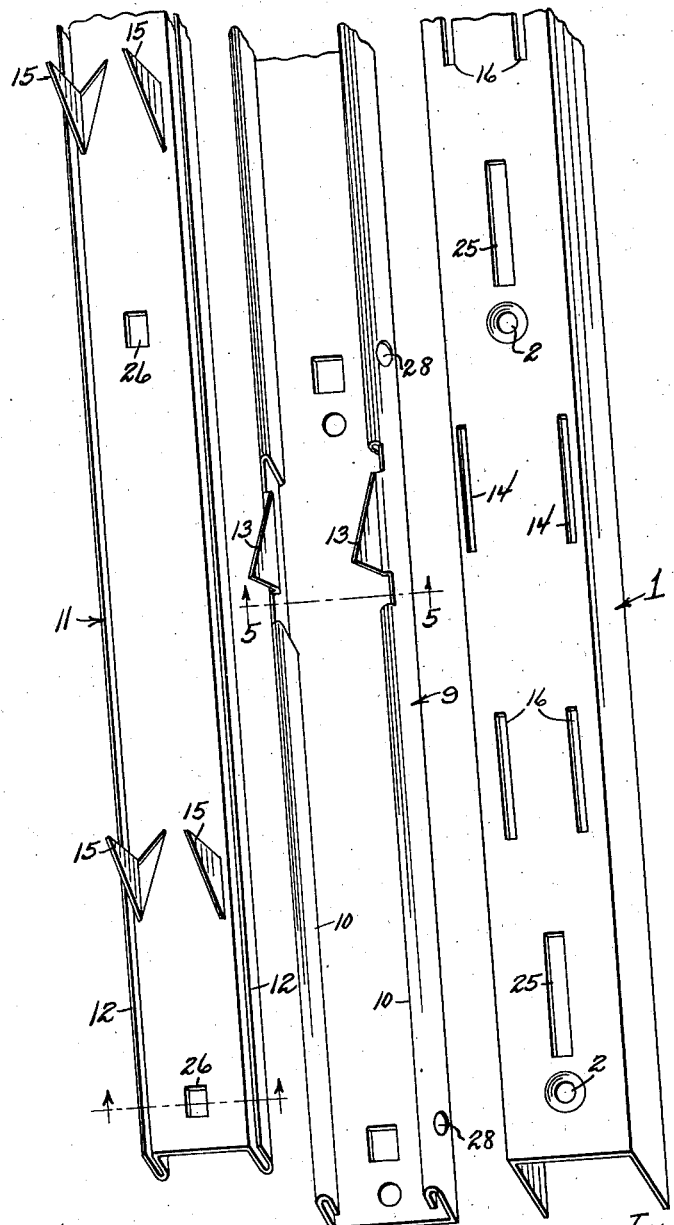
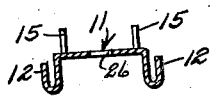
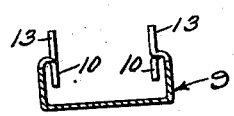
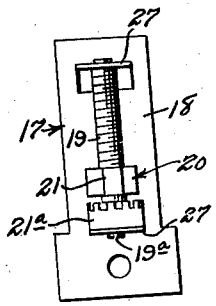
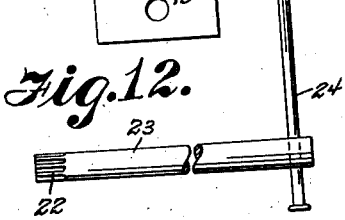
INVENTOR.
Ivan F. Sprunger
BY Victor J. Evans & Co.
ATTORNEYS Nov. 18, 1947.  I. F. SPRUNGER  2,430,961
MECHANICAL DEVICE FOR LOCKING TOGETHER THE
MATCHING SURFACES OF PREFABRICATED PANELS
Filed Dec. 14, 1945  2 Sheets-Sheet 2

INVENTOR.
Ivan F. Sprunger
BY Victor J. Evans & Co.
ATTORNEYS

Patented Nov. 18, 1947

2,430,961

UNITED STATES PATENT OFFICE 2,430,961

MECHANICAL DEVICE FOR LOCKING TOGETHER THE MATCHING SURFACES OF PREFABRICATED PANELS

Ivan F. Sprunger, Seymour, Ind.

Application December 14, 1945, Serial No. 635,001

4 Claims. (Cl. 20—92)

My present invention, in its broad aspect, has to do with improvements in detachable connectors or fastening devices for the panels of walls, floors, ceilings, roofs and the like, of prefabricated construction together. More particularly, it is my purpose to provide improved connecting or fastening devices which will permit convenient and rapid joining together of panels without damage to either panel, and their dis-assembly; and my invention provides a strong, rigid, weatherproof connection between meeting edges throughout the length of the panel, and insures perfect alignment, eliminates looseness and induces superior strength and rigidity. My connectors or fasteners are formed of sheet metal stampings which lend themselves to mass production at a relatively small cost, and standardization as to size or sizes. In fact, one set of dies may be used to produce fitting connectors for panels of any size.

In practice, my device consists of three elements and a key operated device for actuating the device to assemble them and wedgingly engage them together to form a sturdy, rigid and strong assembly. Two of these elements are fixed to the respective meeting edges of adjacent panels, and the other element is a movable element and carries wedging devices whereby interfitting tongue and groove parts are so connected together as to form a weather-tight, rigid joint. The elements are preferably formed in six inch sections, or the like. One of the fixed elements forms a tongue on the edge of one of the panels, and the other fixed element is seated in the bottom of a groove in the edge of the adjacent panel and has inwardly overbent side flanges forming channels to slidably receive the edge flanges of the movable element which slides in the groove and carries wedges and is operated by the actuating device to engage the groove forming element to form a rigid weather-proof joint between the panels and forcing the panels together. In demounting the panels, the actuating element is actuated to release the wedges and permit the panels to be taken down.

Other and equally important objects and advantages of my invention will be apparent from the description and drawings, and it is to be understood that changes in form, size, shape, materials and construction and arrangement of parts are permissible and within the purview of my broad inventive concept, and the scope of the appended claims.

In the drawings, wherein I have illustrated a preferred form of my invention:

Figure 1 is a perspective view of the movable element of my device;

Figure 2 is a perspective view of the fixed elements of my device; mounted in the groove of one of the panels;

Figure 3 is a perspective view of the fixed element of my device forming the tongue of one of my panels and carrying the actuating device;

Figure 4 is a section on the line 4—4 of Figure 1;

Figure 5 is a section on the line 5—5 of Figure 2;

Figure 6 is a top plan view of the actuating device;

Figure 12 is a view of the key.

In the drawings wherein like characters of reference are used for like or similar parts:

Figure 10:
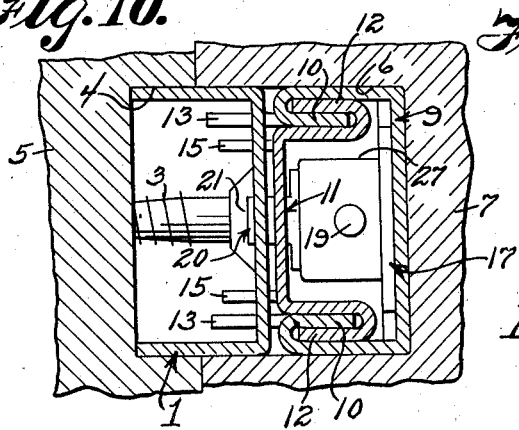
Figure 10 is a transverse section on the line 10—10 of Figure 9.
Figure 11:
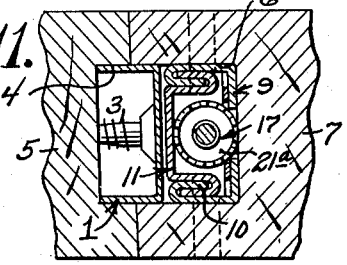
Figure 11 is a transverse section on the line 11—11 of Figure 9.

The numeral 1 designates the tongue forming fixed element of my device which is U-shaped in cross-section, and has openings 2 for screw fasteners 3 whereby said element is fixed in a shallow groove 4 in one panel 5 to form a tongue for interfitting engagement with a groove 6 in the adjacent panel 7. The adjacent panel 7 has fixed by screws 8 in the bottom of the groove 6 an element 9 which has inwardly and overbent flanges 10 on its edges forming channels to receive a sliding element 11 having edge flanges 12 bent U-shaped in cross-section to fit in flanges 10, as shown in Figure 10.

Figure 7:
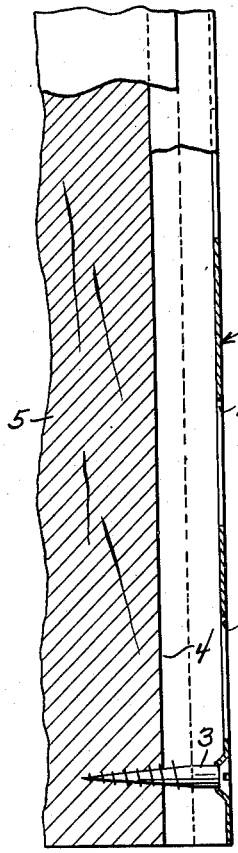
Figure 7 is a side view of the fixed tongue element as mounted on a panel.
Figure 8:
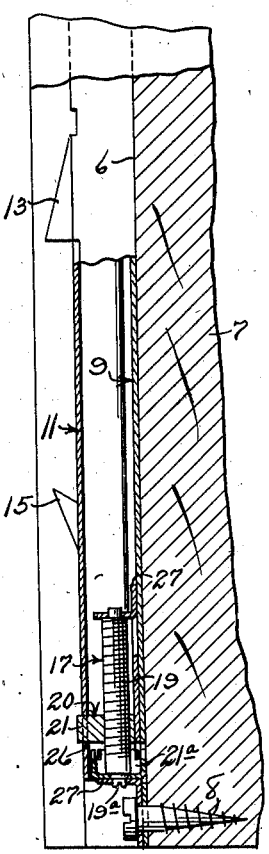
Figure 8 is a vertical section showing the actuating device and wedging device.
Figure 9:
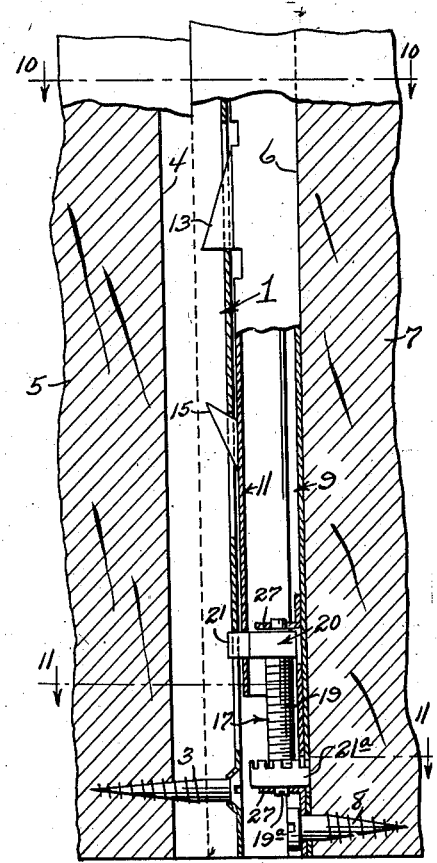
Figure 9 is a vertical section showing the two fixed elements in place on meeting panels, the movable element, and the actuating device as assembled.

The fixed element 9 has pointed angular edge projections 13 struck out from the material of the flanges 10 to engage in slots 14 in tongue forming element 1 to center the panels. The sliding or movable element 11 has wedge shaped out-struck projectors 15 adapted to engage in elongated slots 16 in the tongue forming element 1, when the panels are assembled as in Figures 9 and 10.

An activating device 17—see Figure 6—has a base 18 which may be spot welded or otherwise attached to element 9 and a threaded bolt 19. A traveler 20 having a lug 21 is mounted on the bolt and the bolt has a cog-toothed head 21a to receive the toothed end 22 of a key 23—see Figure 12—having a handle 24 to turn the bolt, the key 23 being inserted through the openings 28 in the flanges 10 of the element 9 at right angles to the head 21a. The lug 21 extends through one of the square openings 26 in element 11. The lug enters the elongated center slot 25 in the element 1 the provision of which prevents the lug from rubbing against the element 1 during movement of the lug 21. It is to be understood that one activating device may be used for a set up unit and while several slots 25 and openings 26 are shown, the actuating device may be set under any pair of openings. By turning the key, the lug is moved to slide the slidable element to move the wedge shaped projection 15 to engage the ends of slots 16 to tighten the assembly and form a rigid weather-proof joint. The shape of the projections 13 and length of the slots 14 are predetermined so that the wedging action of the projections 15 and slots 16 is not limited or interfered with, the projections 13 and slots 14 serving only as guides for the elements 1 and 9, since the inclination of the projections 13 is in the direction of the wedging action of the projections and slots 15 and 16 respectively. Thus the elements 1 and 9 are secured together as a unit by the formation of an airtight hidden joint since the groove 6 is of sufficient depth to permit a tight fit of the elements as well as contact between the outer edges of the grooves 4 and 6. The bolt 19 is rotatably supported between journal brackets 27 in the base 18. To demount the panels, the wedges are moved out of wedging position.

The threaded shaft 19 of the actuating device 17, is provided in the exposed end thereof with a slot 19a, whereby to enable the channels to be locked by operating the shaft 19 with a screw driver. This type of key is used when the ends of the channels are accessible and in such instances eliminates the necessity of drilling a hole in the face of the panel for the reception of the key 23.

The elements 1, 9 and 11 are continuous channels of panel length approximately 8 feet, and the slots, openings, and projections are placed in each six inches of the length of the channel in order that the elements can be cut to any predetermined length down to a six inch unit and still have all necessary elements incorporated therein, to make such unit function as previously described.

From the foregoing, it is believed that the operation and advantages of my invention will be apparent, but it is again emphasized that interpretation of its scope should only be conclusive when made in the light of the claims.

I claim:

1. A detachable connector for units of building construction, comprising units in which meeting edges have registering elongated grooves, a connector element in the groove of one unit extending out of the groove to form a tongue and having slots therein, a pair of interengaged connector elements in the bottom of the groove of the other unit, one of which is slidable with respect to the other, the latter being rigidly secured to said other unit and having projections extending through certain slots in the first connector element, the first connector element forming a tongue registering the units and the slidable element of the pair having angular projections fitting in the other slots of the first connector element and having edges inclined at an acute angle with the body of the slidable element and engaged with the first connector, and a connector moving device for moving the slidable element to wedge the angular projections against the ends of the slots of the tongue forming connector to form a tight fit between the units.

2. The invention as defined in claim 1 wherein the pair of interengaged connector elements are substantially U-shaped in cross section and are reversed in assembly and wherein each has flanges, the flanges of one connector being bent to engage about the flange of the other connector and wherein each of said connectors has projections, one set serving as guides in relation to the tongue forming connector, and the other set acting as wedges in relation to said tongue forming connector.

3. The invention as defined in claim 1, wherein the connector moving device has a screw and a cog, and the screw carries a traveler formed with a lug coupled to the sliding connector.

4. The invention as defined in claim 1, wherein the connector moving device has a screw provided in one end with a slot for the reception of a screw driver, wherein the screw carries a traveler having an element engaging the sliding connector.

IVAN F. SPRUNGER.

REFERENCES CITED

The following references are of record in the file of this patent:

UNITED STATES PATENTS

| Number | Name | Date |
|---|---|---|
| 2,400,162 | Mulligan | May 14, 1946 |
| 1,642,501 | Knell | Sept. 13, 1927 |
| 1,590,441 | Piggot | June 29, 1926 |
| 1,849,852 | Smiley, Jr. | Mar. 15, 1932 |